United States Patent [19]

Sutherland

[11] 3,996,962
[45] Dec. 14, 1976

[54] BACKFLOW PREVENTER AND RELIEF VALVE ASSEMBLY

[75] Inventor: Ray Sutherland, Hopwood, Pa.

[73] Assignee: Rockwell International Corporation, Pittsburgh, Pa.

[22] Filed: Mar. 19, 1976

[21] Appl. No.: 668,627

[52] U.S. Cl. .......................... 137/527.4; 137/215
[51] Int. Cl.² ........................................ F16K 15/03
[58] Field of Search ............. 137/215, 527, 527.2, 137/527.4

[56] References Cited
UNITED STATES PATENTS
3,817,278   6/1974   Elliott ........................... 137/527

Primary Examiner—Alan Cohan
Assistant Examiner—Gerald A. Michalsky

[57] ABSTRACT

A backflow prevention assembly designed for connection between a main supply line and a service pipe in water supply service, comprising two check valves in series and a relief valve for draining the chamber between the two check valves under certain operating conditions.

6 Claims, 4 Drawing Figures

BACKFLOW PREVENTER AND RELIEF VALVE ASSEMBLY

BACKGROUND OF THE INVENTION

Backflow prevention assemblies are well-known in the art. Examples of the prior art can be seen in U.S. Pat. Nos. 2,586,942 to M. H. Grove; 2,646,064 to G. A. Colton; 2,646,816 to D. G. Griswold; 2,706,488 to G. H. Harrington; 3,173,439 to D. G. Griswold et. al.; 3,276,465 to F. K. Wykoff; 3,283,772 to H. W. Ensign and 3,478,778 to A. C. Curtiss et. al.

These assemblies are principally used for preventing contamination of public water distribution systems by preventing backflow or back-siphonage into the system. These assemblies are usually installed, with a gate valve on either side of it, in the line between the main supply line and a service line to a particular installation, such as a hotel, factory, institution, or the like. In normal operation, the gate valves at the ends of the assembly are maintained in wide open condition, so they are not included in this invention, and are not shown herein.

More specifically, the invention relates to certain improvements in backflow prevention devices of the type including a first check valve, a second check valve arranged in series with the first check valve and a pressure differential operated relief valve connected with a zone between the outlet of the first check valve and the inlet of the second check valve for draining that zone, when a given pressure differential exists between the inlet pressure of the first check valve and the pressure in said zone. The relief valve is responsive to the differential of pressures across the first check valve derived from a sensing tap-off located at the inlet side of the first check valve and communicated to one of the pressure chambers in the relief valve, while the other pressure chamber is exposed to the pressure in the aforesaid zone between the check valves.

In a "reduced pressure principle," backflow prevention assembly, the relief valve is designed so that it will open when the pressure in the zone approaches the pressure on the inlet side of said first check valve, as is well understood in the art. The accurate sensing of pressure is particularly important where, as here, the relief valve is designed to operate on a pressure differential of about 2½ p.s.i.

SUMMARY OF THE INVENTION

According to the present invention, there is provided a backflow prevention assembly that is positive in action and operable over a wide range of flows and pressures, yet is constant over that range, and requires relatively lighter springs for actuating the check valves, and a relief valve design that minimizes "hunting" or excessive dripping from the valve.

Another object of this invention is to provide a backflow prevention assembly that includes check valves with relatively light spring force, the force tending to open the check valves being absorbed in large measure by the body of the assembly, but which still opens and closes upon a predetermined pressure differential across the check valve.

Another object of this invention is to provide a relief valve that is more dependable in operation over a large range of absolute pressures.

Another object of this invention is to provide a relief valve that utilizes the pressure in the zone between the check valves to supplement the closing force.

DESCRIPTION OF THE PREFERRED EMBODIMENT

Figure 1:
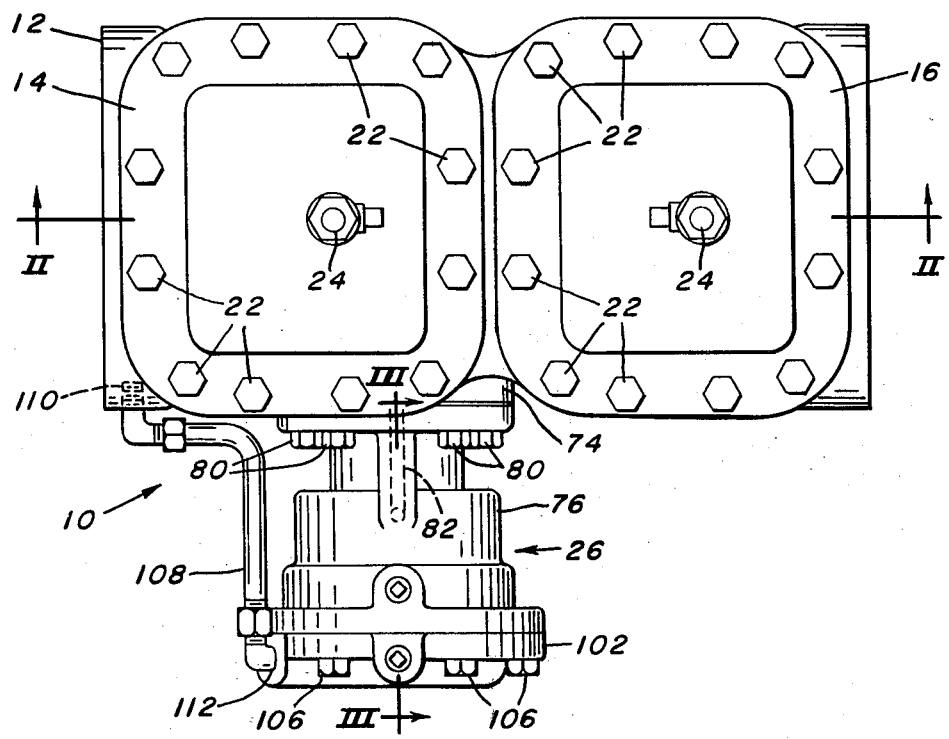
FIG. 1 is a top view of a backflow preventer assembly of the present invention.
Figure 2:
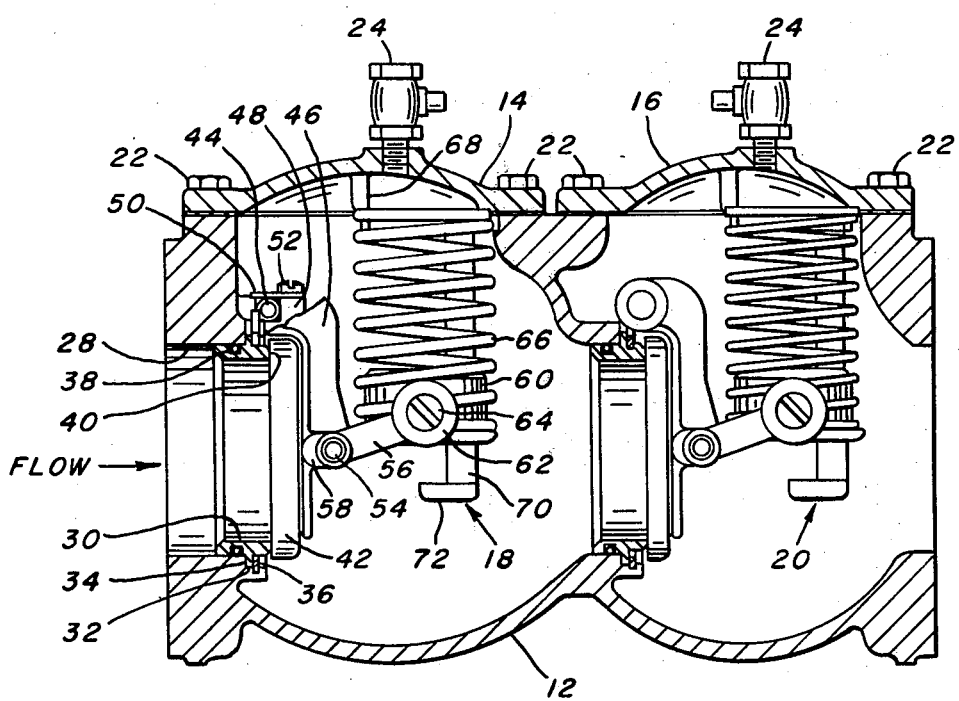
FIG. 2 is a section through the check valves substantially along the line II—II of FIG. 1, with a portion of the clapper control frame of the one check valve broken away to show the hinge construction.

Referring to FIGS. 1 and 2, 10 is a backflow preventer assembly of the present invention. A main case, or body, 12 has covers 14 and 16 closing the access to the check valve mechanisms 18 and 20, respectively. These covers are held in leak-tight relationship by bolts 22. These covers 14 and 16 are made separately for convenience — they could as easily be one unit. Fixed in the top of each, in fluid communication with the interior of the assembly, are test cocks 24, used for periodically testing the assembly. Fixed on one side, in communication with the chamber between the two check valves, is relief valve 26, which will be described in detail below.

This assembly is mounted in a flow line, usually between a pair of gate valves, by bolts into the main housing (not shown). The normal direction of flow from the main supply line is as shown by the arrow in FIG. 2.

The check valves 18 and 20 are identical in construction and operation, except for the sizes of the springs. Accordingly, only the upstream check valve will be described in detail, and this will also apply to the downstream check valve. The inlet 28 through the main case 12 is a uniform size and receives a valve seat 30 in its inner end. The valve seat 30 has a rib 32 around the outside that bears against a shoulder 34 of the inlet opening. The seat 30 is retained in place by a snap ring 36. The clearance between inlet 28 and seat 30 is sealed by an O-ring 38. The inner end 40 of seat 30 is beveled to produce a smaller bearing surface for contact with a facing ring (not shown) seated in the face of clapper 42.

Clapper 42 is suspended from a shaft 44 by a clapper control frame 46. Shaft 44 is seated in the main case 12 behind projections 48 and is held there by covers 50 screwed on top of projections 48 by screws 52. The clapper control frame 46 is generally U-shaped with the open end up, and a cross-brace near the top for stiffness. The legs are bent forwardly (as seen in FIG. 2, this would be to the left) and are drilled to accept shaft 44, which has its axis in the plane of end 40 of seat 30.

Clapper 42 is fastened to clapper control frame 46 by a shaft 54, which also mounts links 56. There are 2 projections 58 on the back of clapper 42. The clapper and links are pivotable on shaft 54. This allows limited pivoting of clapper 42 to adjust to face 40 of valve seat 30.

There are 2 links 56 pivotally mounted on shaft 54. The other end of these links mounts a spring carrier 60 between them, and each link carries a roller 62 on a spindle 64. Seated on spring carrier 60 is a spring 66. The other end of the spring 66 is seated on a boss 68 cast into each cover (in this case, cover 14), biasing the spring carrier 60, the rollers 62 and links 56 downwardly. As seen in FIG. 2, links 56 are designed to be of a length that, when clapper 42 is firmly against end 40 of seat 30, the links form an angle of approximately 30 degrees with the horizontal. The rollers 62 ride on vertical rails or guides 70. These rails are fixed, one on each side wall of the main case, on bottom bosses 72 cast on the inside wall of the main case. The top of each rail is fixed by a cover plate (not shown) screwed on the main case.

Figure 4:
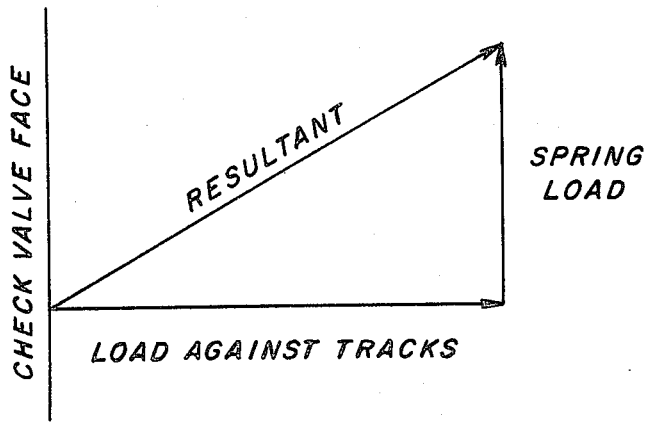
FIG. 4 is a force diagram of the force on the link member between the check valve and the spring-roller combination, showing the resolution of this force into the components and their place of application.

By the above construction, it can be seen that a spring having a loading approximately one-half of the total force necessary to keep the check valve closed is able to be used. Referring to FIG. 4 we see the force diagram corresponding to this construction. The desired force on the check valve face to open the check valve at the desired pressure drop is calculated, and this force is transmitted through the link 56 which is represented in FIG. 4 as the resultant. Some of this force is resisted by the component labeled "Load Against Tracks," while the remainder is resisted by the spring force, labeled "Spring Load." Thus, a smaller spring can be used in this installation. Here is the only difference between check valve mechanism 18 and check valve mechanism 20. The upstream check valve is designed to open and close at a higher pressure differential than the downstream one, so a stronger, heavier spring is used in check valve 18 than in check valve 20. In one size flow line, the pressure differential across upstream clapper 42 requires 8 p.s.i. to open the check valve, while across the downstream check valve, only 2 p.s.i. is needed to move the clapper. This condition means that the upstream check valve is first to close.

As mentioned above, the only difference between the check valve 18 and check valve 20 is the size of the spring. Accordingly, check valve assembly 20 will not be described here.

In order to be certain that fluids from the service line do not backflow into the main (or supply) line, a differential pressure relief valve 26 is installed to monitor the pressure differential across the upstream check valve. A backflow condition exists when the outlet pressure of the assembly exceeds the inlet pressure. If this should occur, backflow would normally be prevented by the downstream check valve. If this check valve should become fouled or damaged, the backflowing fluid will enter the zone between the two check valves. As this zone pressure approaches the inlet pressure, the differential pressure relief valve 26 will operate to maintain the zone pressure at least 2 p.s.i. less than the supply line pressure, and the backflowing fluid will be discharged to atmosphere.

Figure 3:
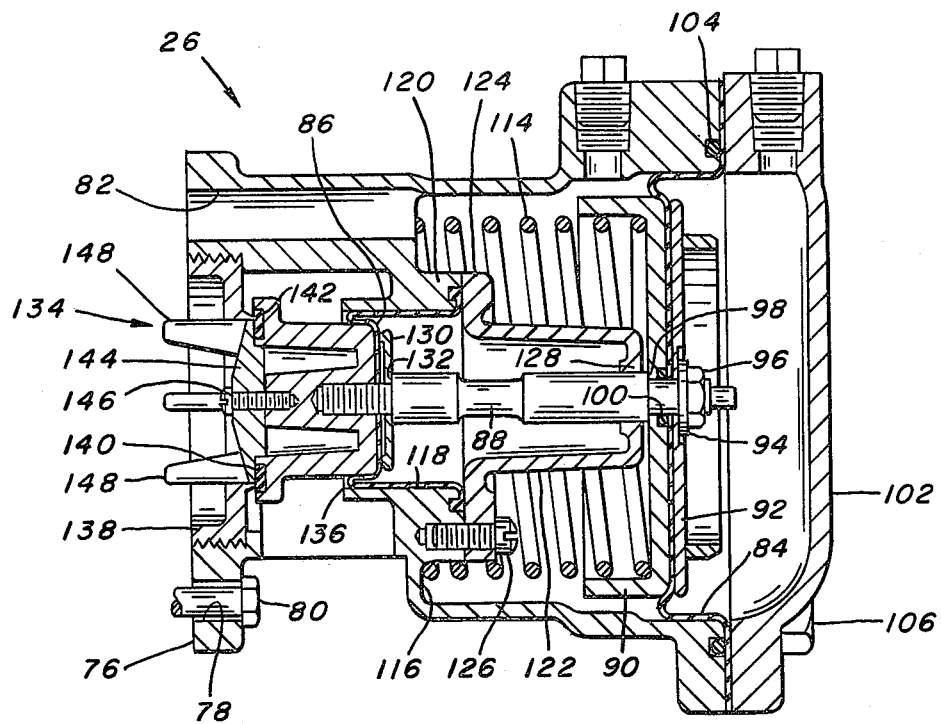
FIG. 3 is a section through the relief valve along the line III—III of FIG. 1.

Relief valve 26, as seen in FIGS. 1 and 3, is fastened to a flange 74 cast on the side of the body 12, which has an opening into the chamber between check valves 18 and 20. Body 76 of the valve 26 has bolt holes 78 which match the bolt circle of flange 74, and the valve is held in leak-tight assembly by bolts 80. A gasket (not shown) may be used. The body 76 has two openings to the chamber of the main case 12. Passage 82 allows the chamber pressure in to the main diaphragm 84 and to the upper side of secondary diaphragm 86. These diaphragms are fixed to act together on a shaft 88. Main diaphragm 84 is fastened in place between a piston 90 and a retainer plate 92 by means of a washer 94 and a nut 96 threaded on the top of the shaft. Piston 90 seats on a shoulder 98 of shaft 88, and carries a seal ring 100 about the shaft. The outer portion of diaphragm 84 is fixed between body 76 and a cover 102. A seal ring 104 seals this joint, and the cover is held in place by bolts 106 (see FIG. 1).

Thus, two chambers are provided for sensing the pressure differential across the upstream check valve. The lower one, delineated by the diaphragms 84 and 86 and the body 76, is open to the chamber between check valves 18 and 20 by means of passage 82. The upper one, bounded by the main diaphragm 84 and cover 102, is connected to the inlet of the backflow preventer assembly by means of tubing and fittings 108. This tubing string is connected to a tapped hole 110 in the inlet 28 and to a tapped hold 112 in cover 102. This puts the pressure of the main supply line on the top side (outer portion from the check valves) of relief valve 26, on main diaphragm 84.

On the under side of diaphragm 84, in addition to the fluid pressure of the chamber between the check valves, there is a spring 114 which bears on a face of piston 90 and has its other end seated on an internal ledge 116 of the body 76 that exerts a force on the piston in a direction to open the valve.

The body 76 of the relief valve has an opening 118 surrounded by a boss 120 on which a spider 122 for guiding shaft 88 is mounted. The opening is closed by secondary diaphragm 86, which is trapped around its outer periphery between boss 120 and the base of spider 122. The spider 122 has a continuous annulus 124 with provision for bolting to boss 120 by bolts 126 as a base, and a continuous annulus 128 atop the plurality of support legs forming a guide for shaft 88. The center of diaphragm 86 is mounted on an end of shaft 88 by being trapped between a retainer plate 130 which abuts a shoulder 132 on shaft 88, and a valve closure member 134 which is threaded on the end of shaft 88. Closure member 134 is elongated to bridge outlet 136 to the atmosphere, and seats, in the closed position as seen in FIG. 3, on a seat member 138 threaded into the bottom of valve body 26. The contact surface of closure member 134 with seat 138 is an insert 140 of relatively resilient material set in a recess 142 of the bottom face of closure 134 and held in place with a cover member 144 which in turn is held on by a threaded member 146. Depending guide fingers 148 project from cover 144 to guide closure 134 in its movements.

It can be seen by reference to FIG. 3 that the unit pressure (p.s.i.) of fluid on the closure member 134 from the chamber between the check valves is equal to the unit pressure on secondary diaphragm 86 which is transmitted by passage 82. One of the disabilities of the prior art encountered in the early testing of this invention was the tendency of the relief valve to "spit" or "dribble" at higher line (and chamber) pressures. The resilient insert 140 had a tendency to move slightly away from the seat member 138 at some random places around the line of engagement. This produced the aforementioned dribbling. An additional sealing force is required to prevent this condition and the magnitude of that force must be proportional to the chamber pressure. The means adopted for correcting this condition was to make the opposing forces on valve closure member 134 unbalanced and proportional to the pressure in the chamber. This was accomplished by making the cross-sectional area of secondary diaphragm 86 slightly larger than the cross-sectional area of closure member 134 exposed to chamber pressure. This provides a supplemental closing force proportional to the line pressure in the system.

By incorporating the above modification, the relief valve can be made to open at one constant differential pressure regardless of the system pressure. For example, tests on an actual unit produced the following results; before the modification the pressure differential across the upstream check valve required to open the relief valve varied from 2.4 p.s.i. at atmospheric line pressure to 3.7 p.s.i. at 150 p.s.i. line pressure. After making the diaphragm area slightly larger than the cover member area, the pressure differential across the upstream check valve required to open the relief valve measured 2.1 p.s.i. at atmospheric pressure in the line, to 2.4 p.s.i. differential at 150 p.s.i. line pressure. The diaphragm area on this unit can be increased further and the spread of 2.1 p.s.i. to 2.4 p.s.i. can be reduced to virtually a constant.

It will be seen from the above description that an efficient, economical, accurate check valve assembly has been invented that is useful to prevent contaminating backflow.

I claim:

1. A check valve assembly adapted to be mounted to accommodate horizontal fluid flow, having a housing and a valve assembly in said housing, comprising: a valve seat in said housing defining a fluid flow passageway, a hinge member mounted on said housing for pivotal movement about an axis normal to the direction of fluid flow, a valve cover member carried by said hinge member adapted to cooperate with said valve seat to control fluid flow through said valve, link means pivotally attached at one end to said hinge member and projecting rearwardly from said cover member, the other end of said link member being pivotally mounted on a roller assembly which bears on a track, said roller assembly being spring biased to the valve closed position, said roller assembly being constrained to move in a vertical path by said track which is fixed to said housing, said link means making an acute angle with the horizontal when said valve assembly is in the closed position, whereby a large portion of the force tending to open said check valve is exerted against said track.

2. The check valve assembly of claim 1, wherein said valve cover member is pivotally mounted on said hinge member.

3. The check valve assembly of claim 1, wherein said hinge member pivot axis lies in the plane of said valve seat face.

4. The check valve assembly of claim 1, in which said housing has a cover member mounted thereon, said cover member providing a seat for said spring, and whereby said valve elements are available for servicing by removal of said cover member.

5. The check valve assembly of claim 1, wherein the angle said link means makes with the horizontal is approximately 30°.

6. A check valve assembly adapted to be mounted to accommodate fluid flow having a housing and a valve assembly in said housing comprising: a valve seat in said housing defining a fluid flow passageway, a valve cover mounted on said housing for pivotal movement about an axis normal to the direction of fluid flow and adapted to cooperate with said valve seat to control fluid flow through said valve, a track fixedly mounted to the rear of said valve cover extending in a direction normal to the pivot axis of said valve cover, a roller assembly mounted on said track for movement thereon, link means pivotally attached at one end to said valve cover and projecting rearwardly from said valve cover, the other end of said link means being pivotally mounted on said roller assembly, means biasing said roller assembly to the valve closed position, said link means making an acute angle with the horizontal when said valve assembly is in the closed position whereby a large portion of the force tending to open said check valve is exerted against said track.

* * * * *